(No Model.)
S. DIESCHER.
DRIVING DRUM.
No. 438,250. Patented Oct. 14, 1890.
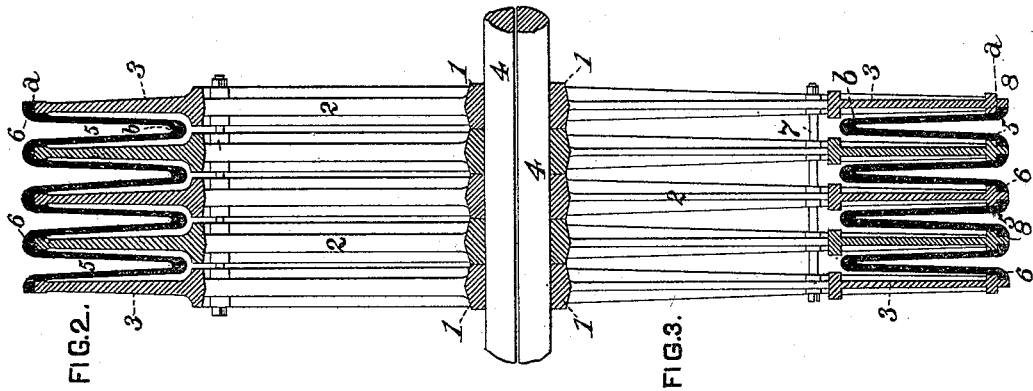
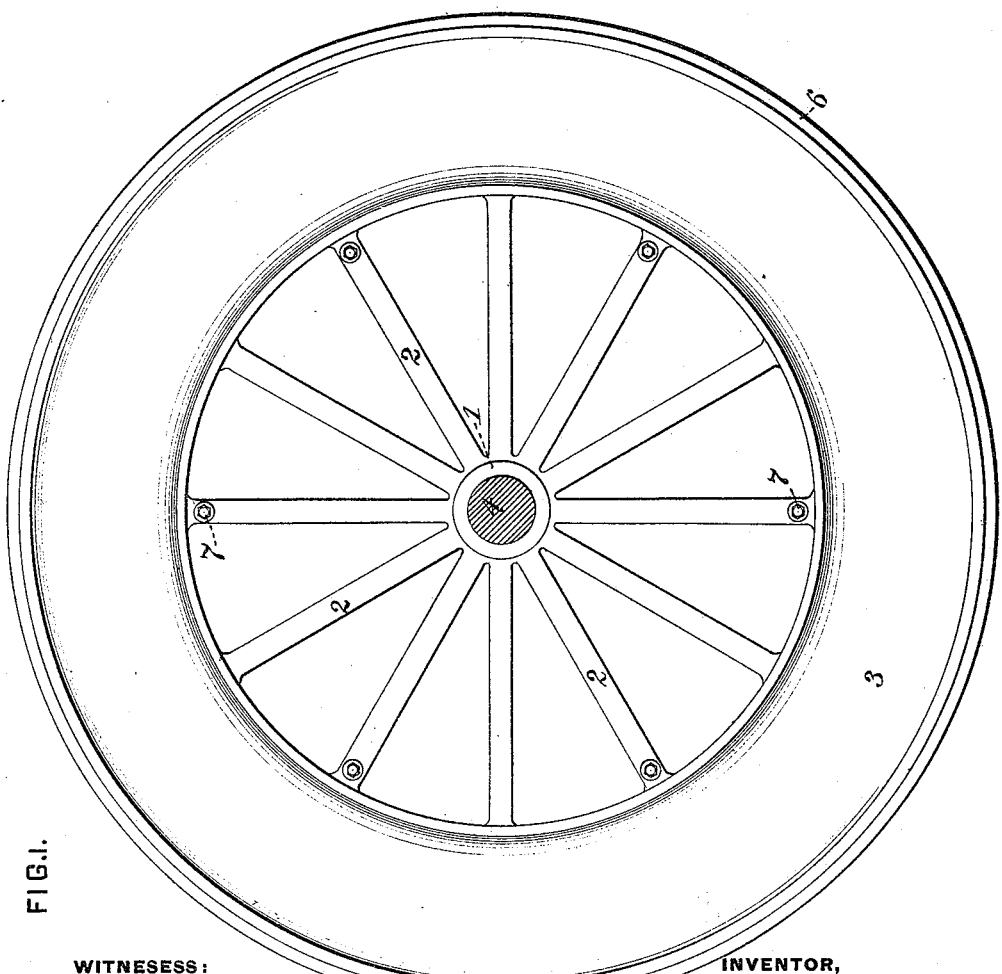
WITNESSES:
Damon S. Wolcott
F. E. Gaither
INVENTOR,
Samuel Diescher
by George H. Christy Att'y.

UNITED STATES PATENT OFFICE.

SAMUEL DIESCHER, OF PITTSBURG, PENNSYLVANIA, ASSIGNOR OF ONE-HALF TO JOHN J. McGILL, OF SAME PLACE.

DRIVING-DRUM.

SPECIFICATION forming part of Letters Patent No. 438,250, dated October 14, 1890.

Application filed August 19, 1889. Serial No. 321,264. (No model.)

*To all whom it may concern:*

Be it known that I, SAMUEL DIESCHER, a citizen of the United States, residing at Pittsburg, in the county of Allegheny and State of Pennsylvania, have invented or discovered certain new and useful Improvements in Driving-Drums, of which improvement the following is a specification.

The invention described herein relates to certain improvements in the construction of winding or driving drums employed in imparting motion to the cables of cable railways, inclined planes, &c. As set forth in Letters Patent No. 387,775, dated August 14, 1888, it is desirable that drums for these purposes should have one or more grooved rings capable of slipping on the surface of the drum when the tension of the cable is in consequence of inequalities of the radii of the groove bottoms abnormally increased, in order to prevent a breakage of the cable. It is well known that the coefficient of friction between two smooth cast-iron surfaces—as, for example, between the inner surface of the rings and the outer surface of the drums—especially when such surfaces are lubricated, is less than that between two (more or less) rough or irregular surfaces—*e. g.*, between the cable and the outer surface of the grooved rings. It is also well known that the momentum of friction between two curved surfaces, the coefficient remaining constant, is proportional to the radius of such surfaces. By the term "momentum of friction," as herein employed, I mean the power or force which is transmitted from a pulley or drum through the medium of a belt or cable, and it is equal to the coefficient of friction multiplied by the pressure multiplied by the radius of the perimeter of the drum; but in the drums, as heretofore constructed, the surfaces having the smaller coefficient of friction—*i. e.*, the perimeter of the drum and the inner walls of the rings—have the smaller radii. Hence it has been necessary to increase the friction between the rings and the drum, in order to prevent any slipping of the rings, except when the cable is subjected to abnormal strains, by applying lateral pressure to the ring or rings, thereby producing a frictional contact between the sides of the rings and adjacent surfaces, so increasing the friction of the rings with the drum and adjacent surfaces that the momentum of friction of the rings—*i. e.*, the coefficient of friction multiplied by the radius—shall equal or approximately equal the momentum of friction of the cable with the outer perimeter or wall of the rings. This increase in friction results in a corresponding increase in the wear of the rings, and the manner of increasing such friction is a matter of experiment, and as the sides of the ring wear the pressure must be adjusted.

The object of the invention herein is to so construct drums of this class or kind that the momentum of friction of the rings on the drums shall equal or approximately equal the momentum of friction of the rope on the rings without increasing the friction by auxiliary means.

In general terms, the invention consists in the construction and arrangement of parts, all as more fully hereinafter described and claimed.

In the accompanying drawings, forming a part of this specification, Figure 1 is a view in side elevation of a winding-drum constructed in accordance with my invention. Fig. 2 is a sectional elevation of one-half of the drum, and Fig. 3 is a similar view of a modification of the same.

The drum proper consists of a series of disks having a hub 1, spokes 2, and a rim 3, formed integral with each other, as shown. These disks are keyed on a shaft 4, the number of disks employed being dependent upon the number of turns of cable placed around the drum. Between these disks are placed rings 5, U-shaped in cross-section, as shown in Figs. 2 and 3, the sides of the rings being provided along their outer edges with flanges 6, having internal diameters equal to the external diameters of the rims 3, on which said flanges rest. The adjacent faces of the rims and of the flanges are made smooth, in order that the rings may slip when the cable is subjected to abnormal strains, as hereinafter described. The interior faces of the rings may be dressed or left in the condition in which they come from the mold or former, as desired.

It will be readily understood that the coefficient of friction at $a$ between the flanges of the rings and the perimeters of the rims 3 is very much less (the surfaces of said parts being smooth) than that between the cable and the walls of the U-shaped rings, as at $b$. Hence to make the momenta of friction of the parts at the points $a$ and $b$ equal the rings are so proportioned radially that the radius of curvature of the perimeter of each of the rings and the inner walls of the flanges of rings will be sufficiently greater than the radius of curvature of each of the rings at bottoms of the grooves therein, so that when the coefficient of friction of the flanges of the rings on the rims and of the cable on the bottoms of the grooves in the rings are multiplied by the radii of said parts—i. e., by the distances from the axes of the disks to $a$ and from the axes of the disks to $b$—the momenta of friction resulting will be approximately equal, the momentum of friction of the flanges and rims being preferably a little greater. In other words, the disks and rings should be so constructed that the radii of curvature of the perimeters of the disks and of the rings at the bottoms of their grooves are inversely proportional, or approximately so, to the coefficients of friction of the flanges and the cable on said parts.

It will be readily understood from the foregoing that no lateral pressure upon the rings is required in order to prevent the latter from slipping; but, if desired, the nuts on the bolts 7, passing through the spokes of the disks, may be tightened up, so that the edges of the flanges may be caused to bear against each other or against a rib 8 separating said flanges, as shown in Fig. 3.

In the patent hereinbefore referred to, springs were employed so as to prevent the rings being clamped too tightly by the bolts, and the same function of resiliency is attained by the shape of the rings 5, whose sides will yield sufficiently to prevent a too tight clamping of the rings. The main function of the bolts is simply to hold the disks in proper relation to each other and to the rings.

I disclaim herein a driving-drum for a cable railway having all its cable-grooves in peripheral rings which are adapted to turn independently of said drum, the same being described and shown in patent to myself and John J. McGill, No. 387,775, dated August 14, 1888.

I claim herein as my invention—

1. A drum for cables, having a series of rings provided with grooves mounted thereon, the radii of curvature of the portion of the drum on which the rings rest and of the bottoms of the grooves in said rings being inversely proportional to the coefficients of friction of the drum and rings and of the cable and rings, substantially as set forth.

2. A drum for cables, having, in combination, a series of two or more disks and one or more grooved rings provided with flanges resting upon the rims of the disks, the radii of curvature of the perimeters of the disks and of the bottoms of the grooves in the rings being inversely proportional to the coefficients of friction of the flanges on the rims and of the cable on the grooves, substantially as set forth.

In testimony whereof I have hereunto set my hand.

SAMUEL DIESCHER.

Witnesses:
DARWIN S. WOLCOTT,
W. B. CORWIN.